E. BALTZLEY.
DESK.
APPLICATION FILED MAR. 5, 1907.

1,028,424.

Patented June 4, 1912.

7 SHEETS—SHEET 2.

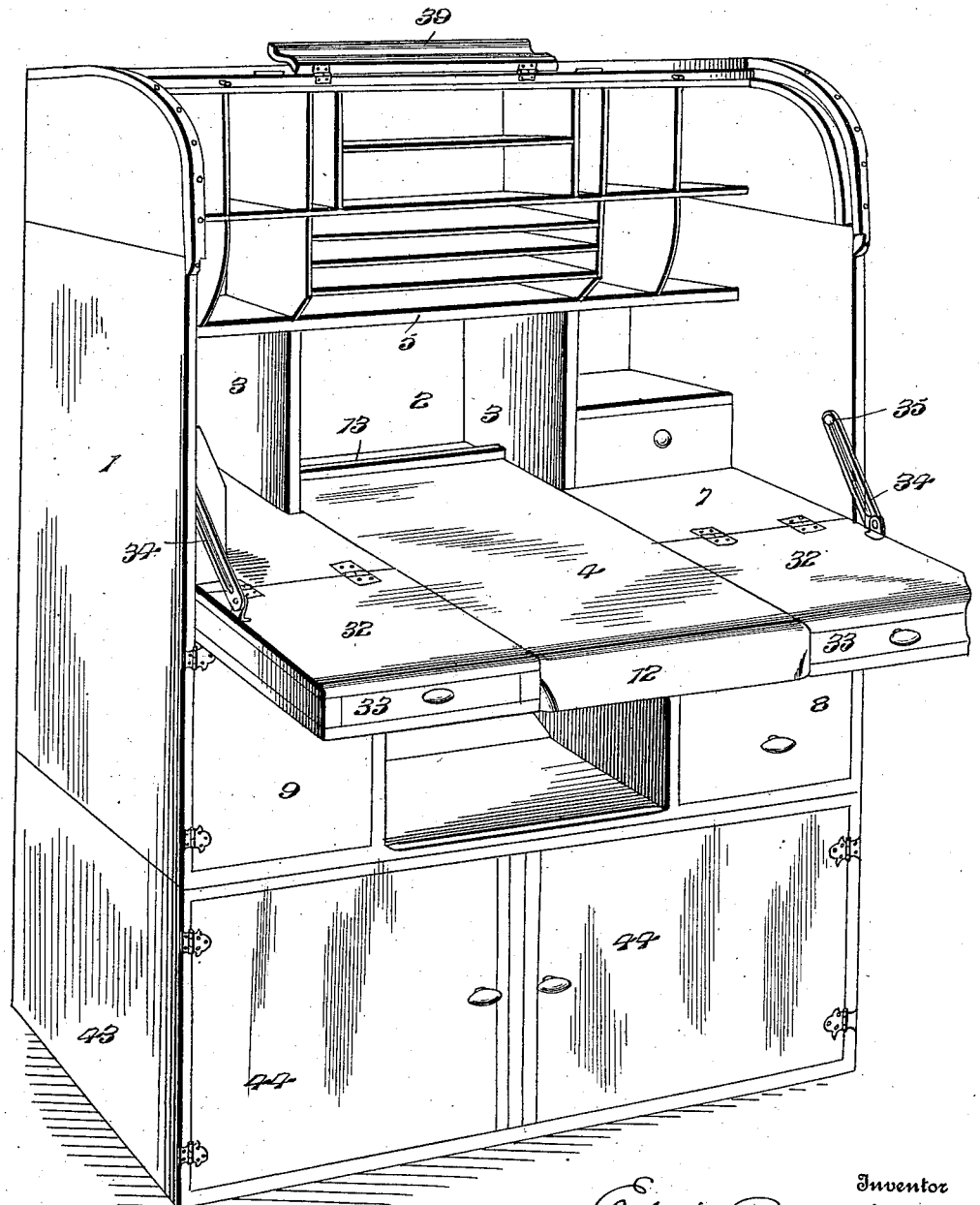

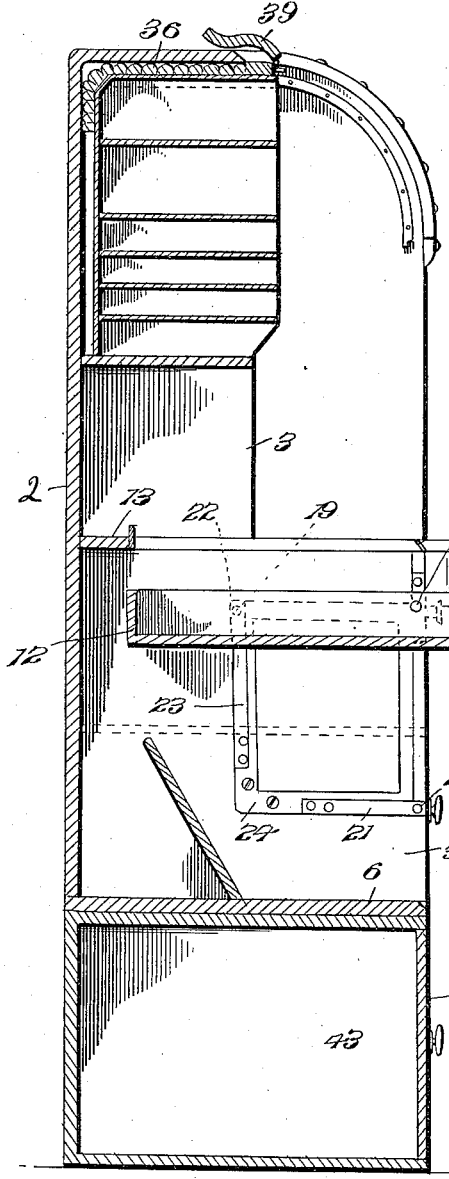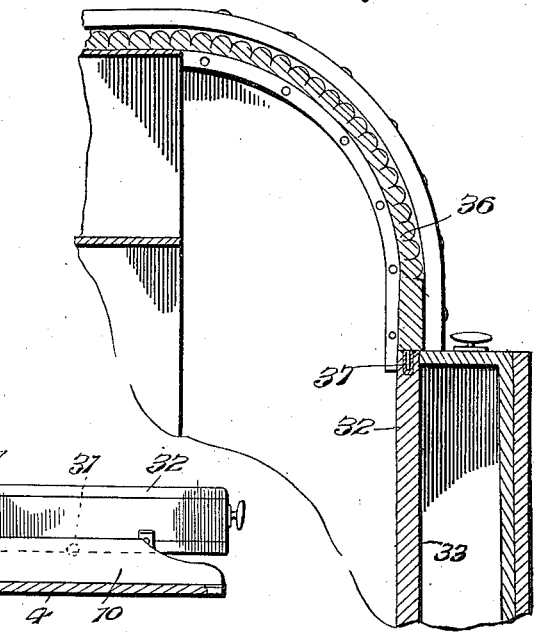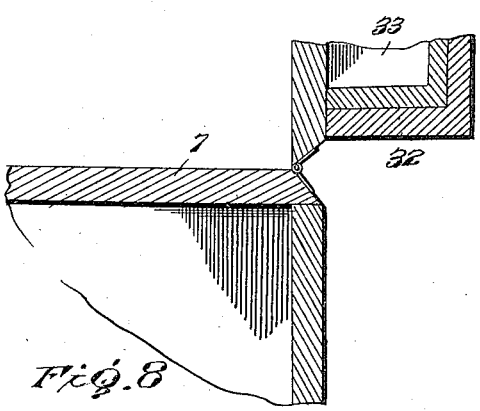

E. BALTZLEY.
DESK.
APPLICATION FILED MAR. 5, 1907.
1,028,424.
Patented June 4, 1912.
7 SHEETS—SHEET 5.
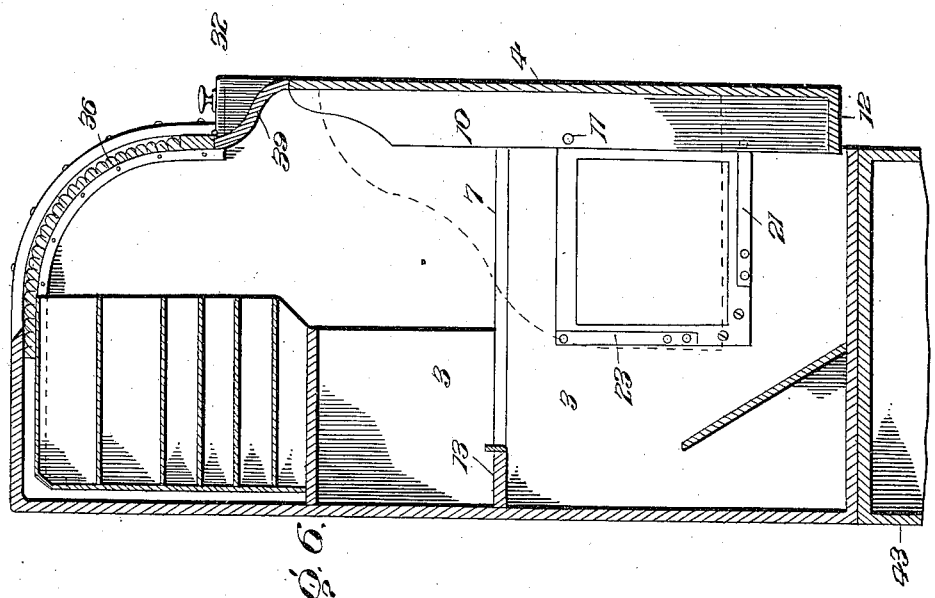
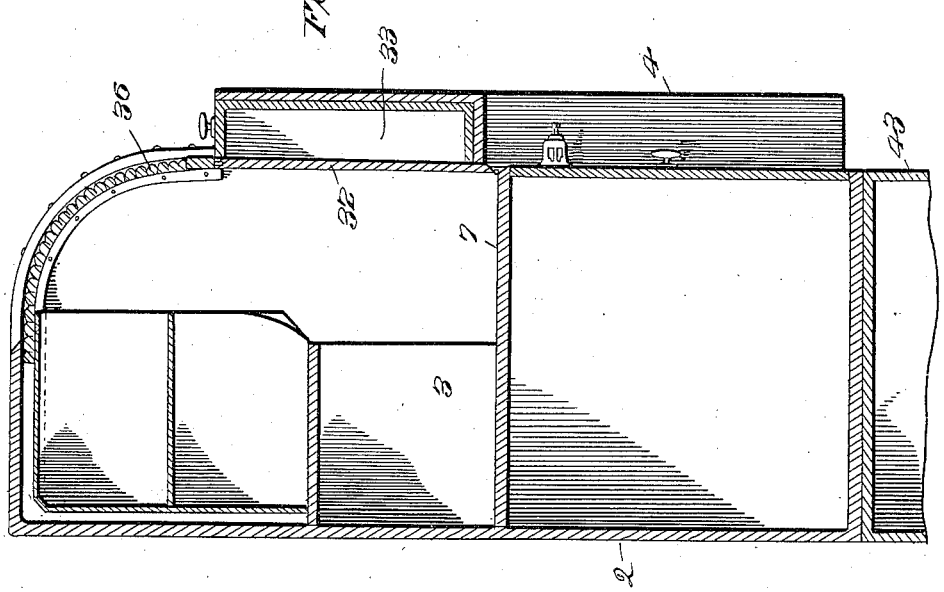
Witnesses
Inventor
Edwin Baltzley,
By Prindle and Williamson
Attorneys E. BALTZLEY.
DESK.
APPLICATION FILED MAR. 5, 1907.
1,028,424.
Patented June 4, 1912.
7 SHEETS—SHEET 6.
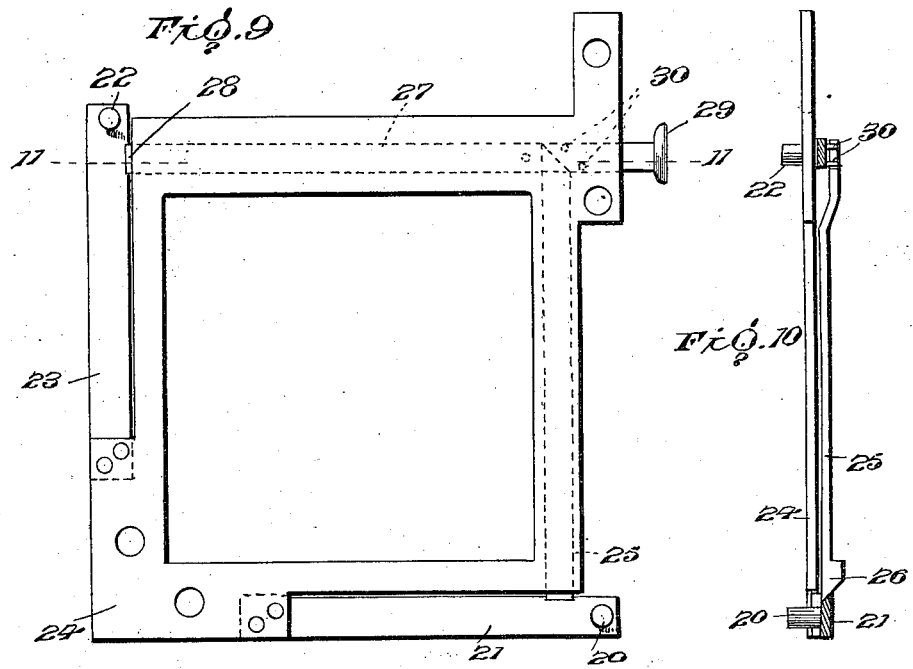
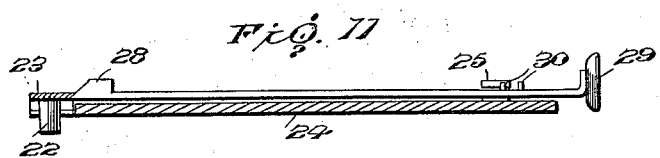
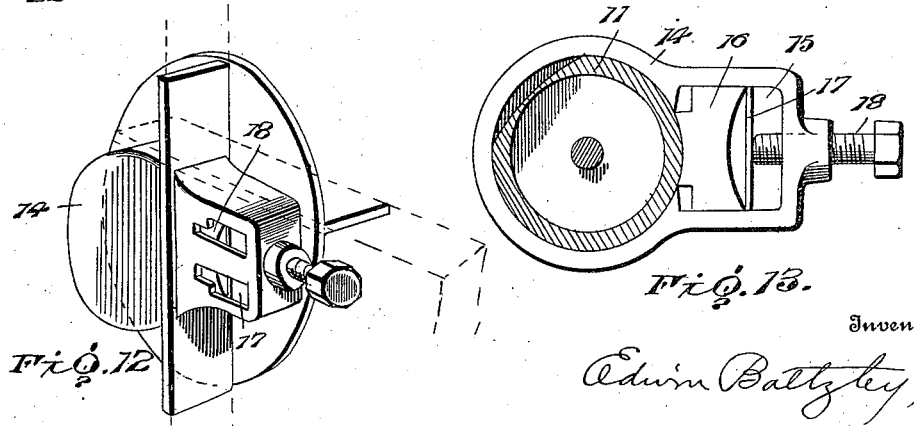
Witnesses
G. B. Prindle
J. L. Lawlor
Inventor
Edwin Baltzley
By Prindle and Williamson
Attorney
COLUMBIA PLANOGRAPH CO., WASHINGTON, D. C.

E. BALTZLEY.
DESK.
APPLICATION FILED MAR. 5, 1907.
1,028,424.
Patented June 4, 1912.
7 SHEETS—SHEET 7.
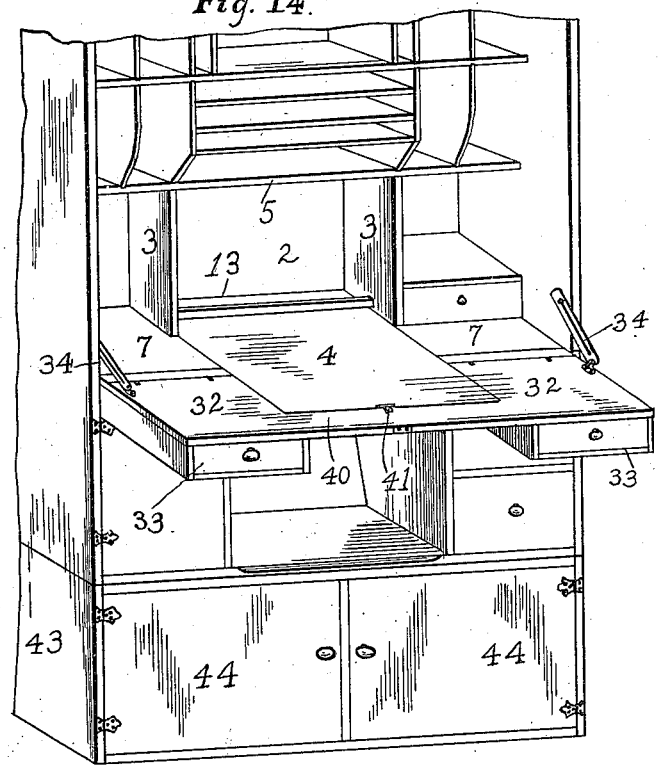
Fig. 14.
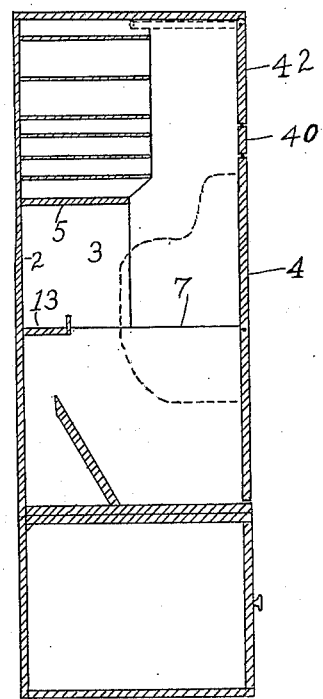
Fig. 15.
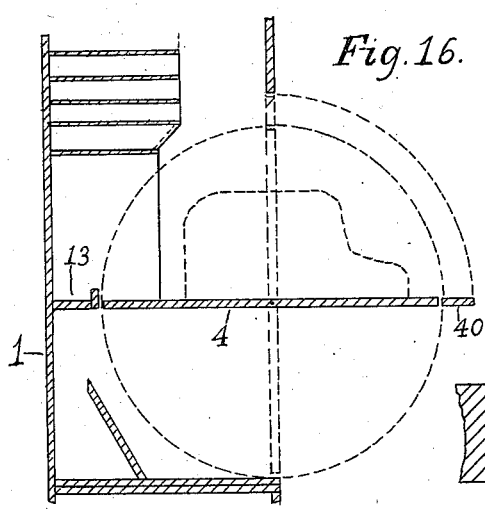
Fig. 16.
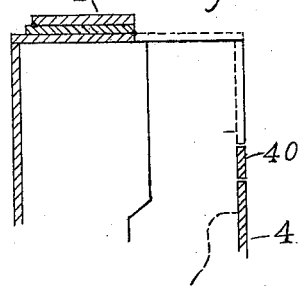
Fig. 17.
Fig. 18.
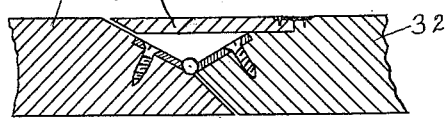
Witnesses
Louis E. Baltzley
Vernon J. Richard
Inventor
Edwin Baltzley,
by Pindle and Williamson
Attorney
COLUMBIA PLANOGRAPH CO., WASHINGTON, D. C.

UNITED STATES PATENT OFFICE.

EDWIN BALTZLEY, OF GLEN ECHO, MARYLAND, ASSIGNOR, BY MESNE ASSIGNMENTS, TO VERNON I. RICHARD, OF WASHINGTON, DISTRICT OF COLUMBIA.

DESK.

1,028,424. Specification of Letters Patent. Patented June 4, 1912.

Application filed March 5, 1907. Serial No. 360,644.

*To all whom it may concern:*

Be it known that I, EDWIN BALTZLEY, of Glen Echo, in the county of Montgomery, and in the State of Maryland, have invented a certain new and useful Improvement in Desks, and do hereby declare that the following is a full, clear, and exact description thereof, reference being had to the accompanying drawings, in which—

Figure 1:
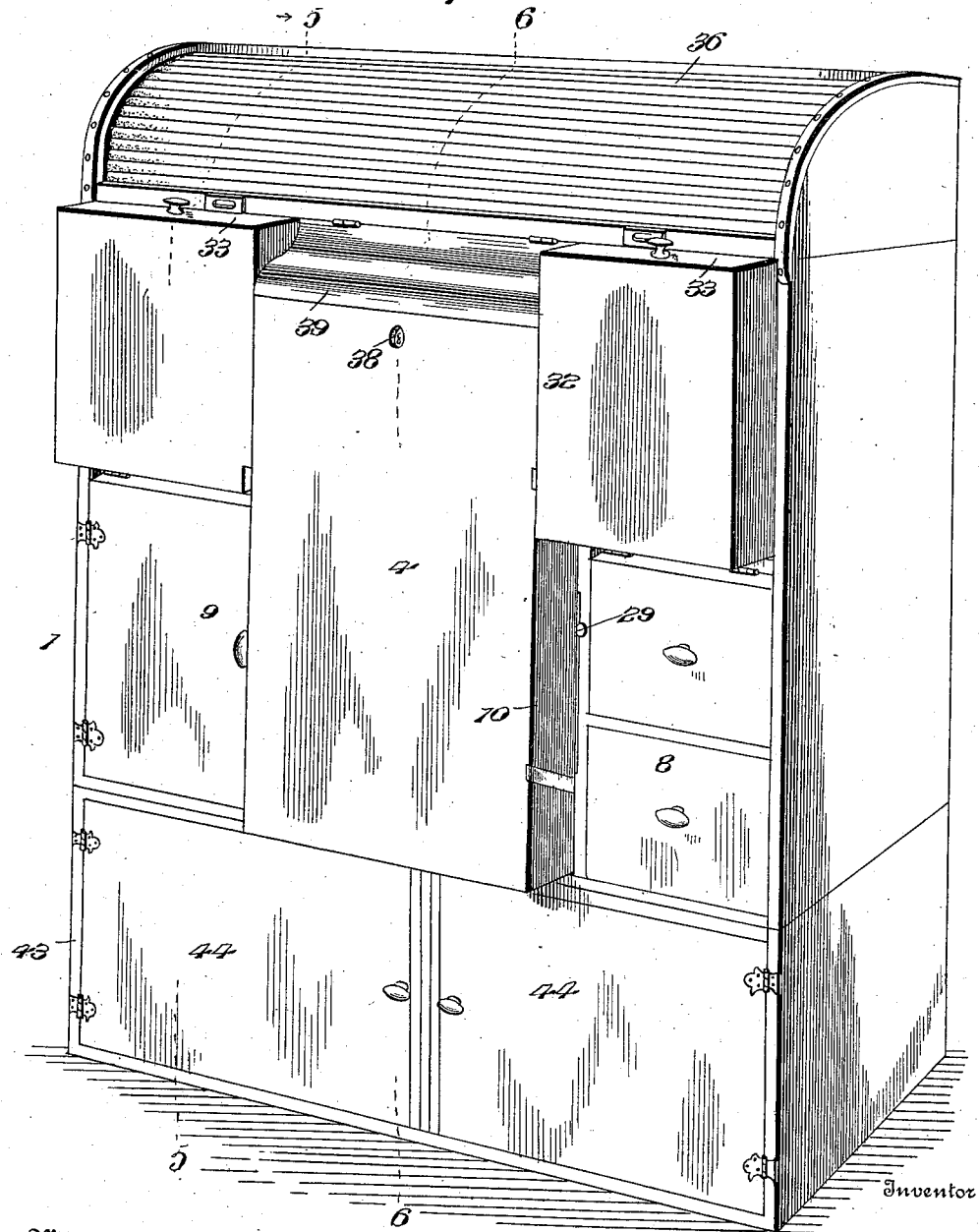
Figure 2:
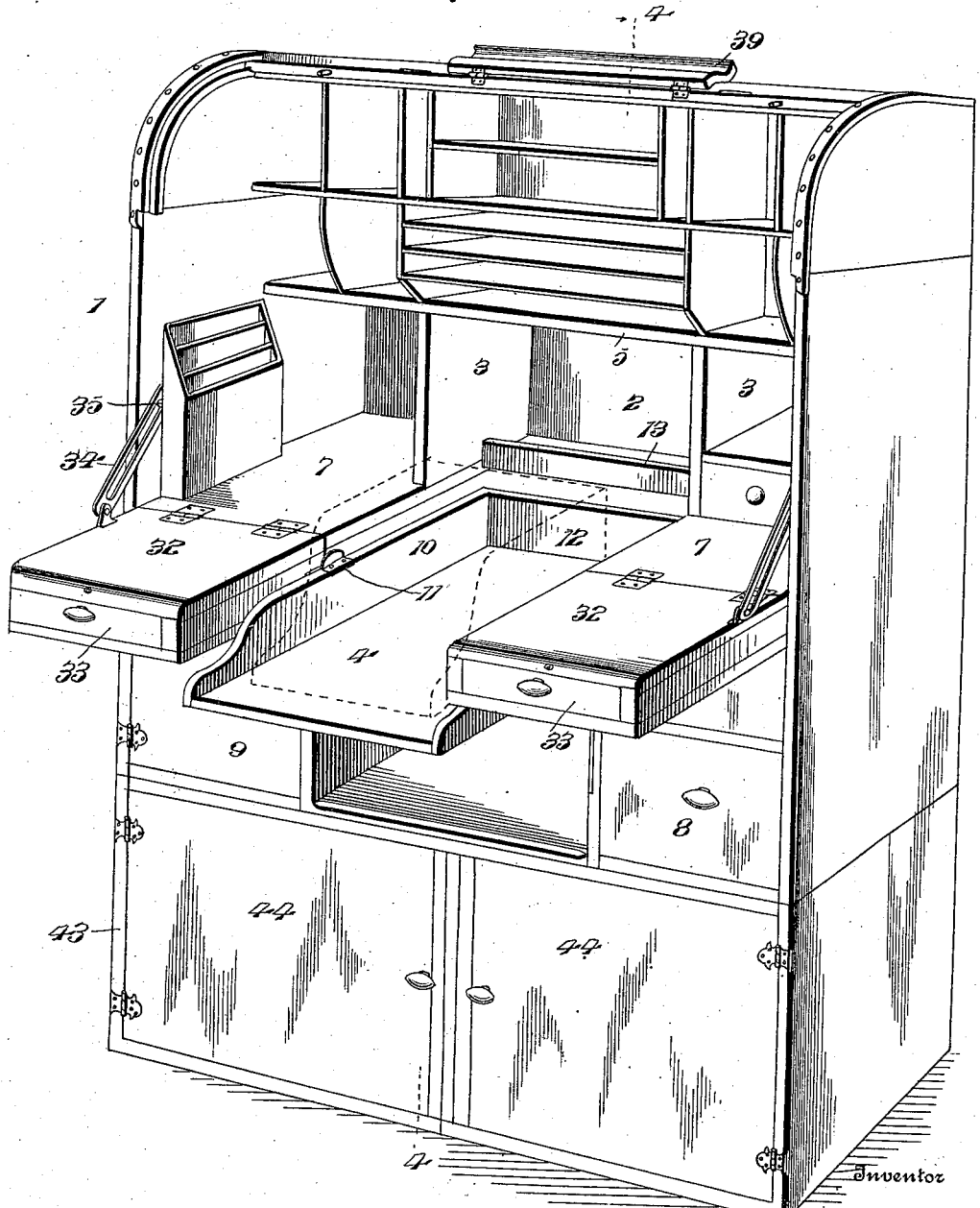

Figure 1 is a perspective view of a desk, in a closed condition, embodying my invention; Fig. 2 is a like view showing it in an open position and arranged for the use of a typewriter; Fig. 3 a view similar to Fig. 2, but arranged for use in writing; Fig. 4 a vertical section on the line 4—4 of Fig. 2; Fig. 5 a section on the line 5—5 of Fig. 1; Fig. 6 a section on the line 6—6 of Fig. 1; Figs. 7 and 8 are detail views in section of portions of the desk similar to what is shown in Fig. 5; Fig. 9 a detail side elevation of the latch mechanism I use for the revoluble leaf; Fig. 10 an edge view thereof; Fig. 11 a section on the line 11—11 of Fig. 9; Fig. 12 a detail perspective view of one form of brake or controlling device that I may use for the revoluble leaf; Fig. 13 a side elevation of the same partly in section; Fig. 14 a perspective view of a different construction of desk embodying my invention; Fig. 15 a vertical section of the same, but with the desk in a closed position, instead of open, as shown in Fig. 14; Fig. 16 a vertical section of part of a desk shown in Figs. 14 and 15, with the leaf arranged for using a typewriter; Fig. 17 a detail view in section of the upper part of the desk shown in Fig. 15, showing the hinged door or cover open; Fig. 18 a detail view in section showing the manner of hinging the leaf of a desk, such as is shown in Figs. 14 to 16.

The object of my invention is to provide a desk of abundant capacity for holding papers, etc., possessing ample horizontal surface for use in writing and capable of conveniently supporting a typewriting machine, and which nevertheless will be extremely compact in respect to its size from front to rear, so that it will require but a minimum of space or room.

A further object of my invention is the production of a desk which may be used as a unit or member of the well known sectional book cases or filing cabinets.

With the objects stated in view, my invention consists in the desk having features of construction substantially as hereinafter specified and claimed.

In the embodiment of my invention illustrated in Figs. 1 to 6, the frame of my desk is composed of simple side pieces 1, a back 2, and two partition-like pieces 3 that are parallel with and situated at suitable distances apart between the sides 1 and constitute a sort of chamber or recess in the central front portion of the desk, in which is movably mounted a leaf 4 in the manner presently described. A portion of the top of said chamber is closed by a horizontal shelf-like partition 5, above which are provided pigeon holes and shelves to receive papers of various sorts and sizes, and the bottom of such chamber is closed or formed by the bottom 6 of the desk, which consists of a board or boards extending from one side to the other and from the front of the desk to the back. At a point which, as shown, is about mid-way from the bottom of the desk to the plane of the shelf 5, the desk has on either side of the chamber, before mentioned, a flat or table-like surface 7 that extends from each side 1 to the adjacent partition 3, and the space beneath each table-like surface 7 and between a desk side 1 and the adjacent partition 3 is utilized, as by means of a drawer 8, or as a cupboard, closed by the hinged door 9, or otherwise utilized. The space above each table surface 7 and below the shelf 5 is utilized by drawers or pigeon holes. The leaf 4 is so mounted that it may be placed in a vertical position to completely close the chamber in the desk at the front thereof, or placed in a horizontal position with a surface flush with and forming practically a continuation of the table surfaces 7, thus constituting a table of a very extended area, and there may be applied or attached to one side of said leaf a typewriting machine which, by the placing of the leaf in a horizontal position, will present such machine in position in readiness for use. To enable the placing of the leaf in the various positions described for the performance of the various functions stated, and to reduce the dimensions of the desk from front to back, and the amount of projection of the leaf when in a horizontal position, I pivotally mount the leaf on a transverse axis at, or substantially at, the longitudinal center of the leaf, and located at, or substantially at, the front of the desk. In the form of leaf illustrated in Figs. 1 to 4 a construction thereof is provided adapted especially for the use of certain of the larger and heavier typewriting machines, which make it desirable to have the bottom of the typewriting machine, when in position for use, well below the horizontal plane of the axis of the leaf, and, as shown in Figs. 1, 2 and 4, this is accomplished by providing the leaf on each side edge with a vertical flange 10, to which a pivot 11, secured to or supported by the adjacent partition 3 is connected. At one end the flanges are connected by a cross-piece 12 which is at the bottom of the leaf when it is in a vertical position, as shown in Figs. 1 and 6, and at the front thereof when it is in the position shown in Fig. 3, when it is arranged so that the typewriting machine is below the level, and a smooth, unobstructed surface is presented uppermost for writing, the presence of the cross-piece at the front of the desk adding to the appearance of the desk by giving it a massive look. Extending between the partitions 3—3 at the back of the desk and at about the level of the leaf 4 when in the position shown in Fig. 3, is a shelf 13 that may conveniently be used for an ink-stand, pens, etc. Because of the more or less unbalanced condition of the leaf 4, due to the sometimes unavoidable unequal distribution of the weight of the typewriter thereon, it is important to control the rotation of the leaf, so that violent movement of the same under the unbalanced weight of the typewriter may be prevented, and for so controlling the turning of the leaf I provide a friction brake which may conveniently have the construction illustrated in Figs. 12 and 13. Said brake is adapted to one of the pivots 11, which is journaled in a box or bearing 14 that is fastened to one of the partitions 3, and which has mounted in a lateral chamber 15 a slidable block or shoe 16 that bears against the periphery of the pivot 11, and is held in contact therewith by a yielding pressure produced by a flat spring 17, whose tension is adjustable by a bolt or screw 18, so that the amount of friction of the pintle may be nicely adjusted.

It is desirable to latch or hold the leaf in its various vertical and horizontal positions, and for this purpose I preferably use the devices best illustrated in Figs. 4, 9, 10 and 11. For latching or holding the leaf in the vertical position shown in Figs 1 and 6, I provide in one of the leaf sides 10 a hole or socket 19, which, when the leaf is in a vertical position, is engaged by a stud or pin 20 on a spring plate 21, and when the leaf is in the horizontal position shown in Fig. 4, said socket is engaged by a pin or stud 22 on a spring plate 23. The latch plates 21 and 23 are attached to a metal frame 24 for convenient mounting in the desk, and as they normally move to and yieldingly remain in locking position, a releasing device is necessary, which device, in the case of latch plate 21 is a vertically movable bolt 25 having a beveled nose 26 to engage and move the latch plate when the bolt is moved downward, and in the case of the latch plate 23 is a horizontally movable bolt 27 having a beveled nose 28 to engage the latch plate 23. The horizontally movable bolt 27 is provided at the front of the desk with a projecting head 29 adapted to be engaged by the thumb to move the bolt inward to release the latch plate 23. To enable the same head to be utilized to release the latch plate 21, the upper end of the latch plate operating bolt 25 is beveled, and one or more pins or projections 30 are provided on the horizontal bolt 27 which, by the inward movement of the latter, engage the inclined upper end of the bolt 25, and thereby cause downward movement of the latter. To secure the leaf 4 with its unoccupied side uppermost, as shown in Fig. 3, a second hole or socket 31 is provided in one of the sides 10 for engagement by the latch plate stud 22. It will be seen that this latch mechanism is a very simple one, notwithstanding the fact that it holds the leaf in three different positions, and that it may be most conveniently operated, as for all the positions of the leaf it is manipulated at but a single point, which is conveniently located at the front of the desk.

It is desirable, for the sake of appearances, and to provide an extended surface at either side of the leaf 4, to employ at each side thereof a hinged leaf 32 which is pivoted at the front edge of the table surface 7, and which, when the leaf 32 is in a horizontal position, as shown in Figs. 3 and 4, is in the same plane as, and constitutes a continuation of, the table surface 7, as well as of the surface of the leaf 4 when the latter is arranged to provide simply a writing surface. The leaves 32 are movable into a vertical position, as shown in Figs. 1, 5 and 7, alongside the leaf 4 when in a vertical position, and thereby close the front of the desk at either side of the leaf 4. I make each of the leaves 32 in the form of a box or casing containing a sliding drawer 33, so as to further utilize these leaves and add to the capacity of the desk, as well as its appearance, when arranged as shown in Fig. 3, because the front and sides of the leaves in this position present an appearance of solidity and massiveness, which is quite desirable. For supporting each leaf 32 in a horizontal position, there is pivoted to the outer side of each a slotted link 34, the slot of which is placed over a headed pin 35 on the side of the desk, and the fit of the head of the pin against the side of the link 34 is sufficiently close to produce enough friction to enable the link and pin to hold the leaf 32 in its raised position against the danger of falling from its mere weight.

The top of the desk may be closed in any desired way. Thus, when, as shown in Figs. 1 to 7, the desk is carried to a height above the level of the tops of the leaves 4 and 32 when in a vertical position, the portion of the desk above said leaves may be like the familiar roll-top construction, a sliding, flexible section 36 being used to reach from the stationary top of the desk to the tops of the leaves 4, and 32, when in a vertical position. When the flexible section 36 is in its closed position, as shown in Figs. 1, 5, 6 and 7, its lower edge overlaps the outer ends of the leaf drawers 33, and thus locks them from being opened, and bolts or pins 37 are placed on the bottom of the section to enter holes or sockets in the leaves 32 to secure the latter in their vertical position. A key-actuated lock 38 being provided to lock the section 36 and the leaf 4 together, when the desk is closed, it will be seen that all the movable members of the desk are securely locked by means of a single, key-actuated lock. As, in the design of desk shown, the top of leaf 4 when in a vertical or closed position does not reach to the level of the tops of the leaves 32, the flexible section 36 is provided at its bottom with a hinged member 39 that fills, or bridges over, the space between the two leaves 32 above the leaf 4.

In the embodiment of my invention illustrated in Figs. 14 to 16, instead of separate or independent side leaves 32, I connect the two side leaves by a cross piece 40 at the front or outer ends of the leaves, or make what is in effect a single leaf, notched or cut-away at its central portion to accommodate the leaf 4. A spring latch 41 latches or locks the leaf 4 and the cross piece 40 together, so that the leaves will move together in opening and closing the front of the desk, that is to say, in the movement of the leaves from a vertical to a horizontal position, but the leaf 4 may be revolved independently of the leaves 32, as in the case of the embodiment of my invention illustrated in Figs. 1 to 6. In the construction illustrated in Figs. 15 and 16, the leaf 4 is a simple board, so that in its vertical and horizontal positions, it is in the same plane as the leaves 32 when in the same positions, and the leaves 32 are not provided with drawers, the result of this construction being that when the leaves are in vertical position, the front of the desk is a practically flat or plane surface; and instead of the roll-top construction illustrated in Figs. 1 to 6, the space at the top and front of the desk above the leaves 32, when in a closed position, is closed by a hinged sliding door 42, similar to that used in the sectional bookcase construction. The top of the desk may, therefore, as shown in Fig. 15, be perfectly level or flat from front to back, so that it may most advantageously be used as a unit in the so-called sectional bookcase or filing cabinet systems, by reason of its flat top permitting other sections to be placed upon it. To permit the simultaneous swinging of the leaf 4 and the side leaves 32 shown in Figs. 14 to 16, it is necessary to have the axes of the leaves in line with each other, and as this involves the dropping of the hinges of the leaves 32 below the plane of the tops of the tables 7 and the cutting away of the upper surfaces of the side leaves 32 and the tables 7 where they are contiguous to each other, an objectional cavity might exist in the top of the desk when open. I, therefore, hinge to each leaf 32 a supplemental leaf or filling piece 32ª to bridge over or cover the space or recess, the supplemental leaves moving inward and backward when the leaves 32 are moved upward to desk-closing position and moving forward and dropping into proper position when the leaves 32 are moved to desk-opening position.

In Figs. 1 to 4 and 14 to 15, I show my desk as a unit in a sectional system mounted upon a unit having the same dimensions horizontally as my desk, and in the form of a cabinet 43 with hinged front doors 44.

As shown in Fig. 17, a door, closing the bookcase at the top and front, is shown, composed of two sections 45 hinged to each other, and one of which is hinged to the top of the desk, the construction being a familiar one.

It will be observed that when the leaf 4 is in vertical desk-closing position, the typewriter is completely housed within the desk, so that it is protected from dust and from possible injury by being accidentally struck, which is a very likely occurence when the machine is left in an exposed position; and when the leaf 4 is in a horizontal position with the typewriter beneath it, the typewriter is projected sufficiently far within the desk as to be virtually out of sight and out of the way, so that one may sit at the desk and use it with perfect comfort.

Although peculiarly fitted as a unit or element in a sectional bookcase or cabinet system, nevertheless my desk is capable of use as a complete piece of furniture in itself, and is very desirable, because of its compactness or economy of room, both when arranged for use, as well as in a closed condition; and it is especially desirable as a typewriter desk because of the most convenient arrangement of shelves, pigeon holes, etc., which it affords.

It is to be understood that I do not limit the scope of my invention to the particular details of construction which I have illustrated and described, nor is it necessary that all the various devices I have described be embodied in one organization; and I also wish it understood that, though I have made especial reference to the employment or use of typewriters, I nevertheless regard the adaptation of my invention for other machines which it may be desirable to use the same, to be within the scope of my invention.

Having thus described my invention, what I claim is:—

1. A stand or desk having a cabinet, and a combined cabinet closure and table, comprising a swinging member and a rotatable member, both of said members having extended table-forming surfaces.

2. A stand or desk having a cabinet and a combined cabinet closure and table, comprising a swinging member and a rotatable member, and means for controlling the rotation of said rotatable member, both of said members having extended table-forming surfaces.

3. A stand or desk having a cabinet, and a combined cabinet closure and table, comprising a swinging member and a rotatable member, and a brake controlling the rotation of said rotatable member.

4. A desk or stand having a rotatably mounted leaf whose axis is at or near the front of the desk, a portion of the leaf when in a horizontal position being projected beyond the front of the desk and a portion in rear thereof, and a swinging leaf at either side of said rotatably mounted leaf and movable to a horizontal or table-forming position.

5. A desk or stand having a rotatably mounted leaf whose axis is at or near the front of the desk, a portion of the leaf when in a horizontal position being projected beyond the front of the desk and a portion in rear thereof, and a leaf carrying a receptacle pivoted at the side of said rotatably mounted leaf and movable toward and from the front of the desk.

6. In a desk, the combination of walls or partitions intermediate the desk sides forming a chamber, a table-forming surface at each side of such chamber, a leaf rotatably mounted in such chamber and having a surface adapted to lie in the plane of such table surfaces, and a leaf hinged to said desk at each side of said rotatably mounted leaf each of said hinged leaves having a surface adapted to lie in the plane of said table surfaces.

7. In a desk, the combination of walls or partitions intermediate the desk sides forming a chamber, a table-forming surface at each side of such chamber, a leaf rotatably mounted in such chamber and having a surface adapted to lie in the plane of such table surface, a leaf at each side of said rotatably mounted leaf having a surface adapted to lie in the plane of said table faces, and desk compartments above and below such table surfaces a space being provided between the desk compartments below the table surfaces to accommodate the rotatably mounted leaf.

8. In a desk, the combination of two table-forming surfaces separated by a space, a leaf rotatably mounted between such surfaces and having a surface adapted to lie in the plane of the table surfaces, and a leaf at each side of said rotatably mounted leaf having a surface adapted to ile in the plane of said table surface.

9. The combination of a desk or stand having a rotatably mounted leaf, a pair of latches situated to hold the leaf in different positions, a slidable bolt for each latch and coöperating with the latter to actuate the same, and means common to both bolts for operating the latter.

10. The combination of a desk or stand having a rotatably mounted leaf, a pair of latches situated to hold the leaf in different positions, a slidable bolt for each latch to actuate the same, means for actuating one slidable bolt from the other, and a single frame supporting all said parts.

11. In a desk or stand, the combination of a rotatably mounted leaf, one or more drawer-carrying swinging leaves alongside the rotatable leaf, and a desk closure engaging said leaves when in a closed position and the drawer or drawers.

12. In a desk or stand, the combination of a combined cabinet closure and table, comprising a rotatable member and two swinging leaves, side by side, whose axes are below the plane of the top of the leaves when arranged as a table, and a supplemental leaf for bridging a cavity in the top surface of the desk.

In testimony that I claim the foregoing I have hereunto set my hand.

EDWIN BALTZLEY.

Witnesses:
CLYDE B. WEIKERT,
CHAS. J. WILLIAMSON.

---

Copies of this patent may be obtained for five cents each, by addressing the "Commissioner of Patents Washington, D. C."